Nov. 25, 1969    F. H. ATTIX    3,480,776

THERMOLUMINESCENT DOSIMETRY TEST SYSTEM AND METHOD

Filed March 31, 1967

INVENTOR
FRANK H. ATTIX

BY *[signature]* AGENT
*[signature]* ATTORNEY

United States Patent Office 3,480,776
Patented Nov. 25, 1969

3,480,776
THERMOLUMINESCENT DOSIMETRY TEST
SYSTEM AND METHOD
Frank H. Attix, Hillcrest Heights, Md., assignor to the
United States of America as represented by the Secretary of the Navy
Filed Mar. 31, 1967, Ser. No. 628,240
Int. Cl. G01t 1/16
U.S. Cl. 250—83.3                                    4 Claims

ABSTRACT OF THE DISCLOSURE

This disclosure is directed to a simple circuit for delivering constant power to a single dosimeter chosen from a group of thermoluminescent dosimeters which are designed with internal ohmic heating elements of substantially the same resistance value. The circuit includes a constant voltage source and a resistor within a series circuit which is controlled by a switch. The resistor in the circuit has a resistance value equal to the average resistance of the ohmic heating elements of the group of dosimeters. The dosimeter to be measured is connected in the circuit in series with the constant resistor and the constant voltage source.

---

The invention described herein may be manufactured and used by or for the Government of the United States of America for governmental purposes without the payment of any royalties thereon or therefor.

The present invention is directed to a circuit for heating thermoluminescent dosimeters and more particularly to a simple improved circuit for delivering a constant power to a thermoluminscent dosimeter being checked for radiation dosage.

Thermoluminescent dosimeters fall into two general classes: (a) Those heated for thermoluminescence readout by a separate device, e.g. a hot-plate or planchet upon which the dosimeter is placed after exposure to radiation, and (b) Those which include a heating element as an integral part of the dosimeter. The latter type usually has been heated ohmically by passing an alternating or direct current through electrical leads which penetrate the dosimeter envelope.

One of the problems in the manufacture of internally-heated dosimeters such as shown in Patents 3,115,578 and 3,283,150 is to produce heating elements which do not vary in resistance from one dosimeter to another. Assuming other dosimeter characteristics to be identical, differences in resistance will give rise to differences in heating rate, resulting in "squeezing" or "stretching" of the glow curve vs. time, if the heating current is delivered under typical constant-current or constant-voltage conditions. (For example, if an individual dosimeter has a heating element 10 percent lower in resistance than the average of a group of dosimeters, then a constant-current source will deliver 10 percent less power, and a constant-voltage source 10 percent more power, to that dosimeter than to a "normal" one.).

Thermoluminescence readers which measure glow-peak height, and those which measure the light sum, are both sensitive to heating-rate variations. In the latter case, the dependence stems from the fact that the light-summing is usually terminated at a fixed time after the beginning of the heating cycle, but the influence of thermal quenching of the luminescence can also give rise to a variation of glow-peak area with heating rate. A greater degree of heating-rate uniformity amongst a given group of dosimeters can be obtained through the use of a circuit which delivers approximately constant power.

It is therefore an object of the present invention to provide an improved circuit for heating thermoluminescent dosimeters.

Another object is to provide a simple constant-power-level circuit which compensates for variability in resistance values amongst a group of separate dosimeters.

Yet another object is to achieve a greater degree of uniformity in performance amongst a group of internal-heater type thermoluminescent dosimeters.

Still another object is to allow greater latitude and economy in the manufacture of thermoluminescent dosimeters by lessening the requirement for strict uniformity in resistance from one dosimeter to another.

Even another object of the invention is to provide a simple circuit which delivers an approximately constant power level into a variable resistance in an individual load.

While still another object is to provide a simple circuit which delivers an approximately constant power level into each member of a group of loads which differ, one from another, in resistance value.

Various other objects and advantages will appear from the following description of an embodiment of the invention, and the novel features will be particularly pointed out hereafter in connection with the appended claims, wherein:

Figure 1:
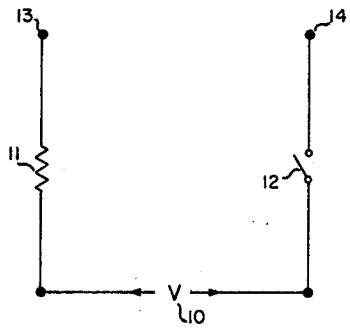
FIG. 1 represents an electrical circuit for carrying out the invention.

As shown in the drawing, FIG. 1 illustrates a constant voltage source 10 with a constant resistance resistor 11 in one line from the constant voltage source and a switch 12 in the same or other line.

Figure 2:
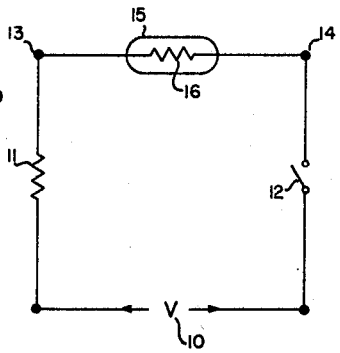
FIG. 2 illustrates the electrical circuit with a dosimeter connected therein for applying heat to the dosimeter and FIG. 3 illustrates a variable resistor in the circuit shown in FIG. 1.

FIG. 2 illustrates the same circuit with a thermoluminescent dosimeter 15 heated by a resistor 16 constructed therein and connected in series with the constant voltage source 10 and the constant resistance resistor 11. The resistor 11 is chosen to have a resistance value equal to the average resistance of a plurality of thermoluminescent devices 15 which are connected (one at a time) between the points 13 and 14 in order to heat them and thereby (by measuring the light emission) to determine the amount of radiation incident on the thermoluminescent device.

The constant-resistance resistor 11 must be capable of continuously dissipating considerable power, and is chosen to have a resistance value $R_C$ equal to the average resistance value $\overline{R}_D$ of the dosimeter group in which the radiation is to be determined. A constant voltage is applied to the circuit, therefore a constant voltage V is applied across the series combination of resistor 11 and (in turn) each of the dosimeter resistors 16 of the dosimeters 15 which are connected into the circuit.

Figure 3:
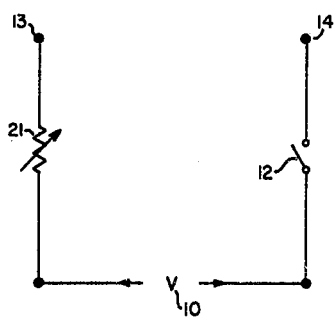

FIGURE 3 illustrates the circuit described above as shown in FIG. 1 with a variable resistor 21 substituted for the constant resistance resistor 11 shown therein. Obviously, dosimeters may be made with ohmic heaters having different resistance values, therefore the circuit has been shown with a variable resistor so that the variable resistor may be changed to a resistance value which is the average of the dosimeters to be checked. Thus, the same circuit may be used by varying the resistance value of the resistor to determine radiation dose of different groups of dosimeters in which each group has ohmic heaters of about the same resistance value. The important thing is that the resistance value be constant during testing each dosimeter of that particular group.

It is also possible to replace the constant resistance resistor by a constant-impedance element which comprises inductive and/or capacitive, and/or resistive components for use in an alternating current circuit.

In operation of the device for determining the amount of radiation incident onto the thermoluminescent dosimeter, the above described circuit is used in combination with a light detector and recorder circuit which is well known in the art. The thermoluminescent dosimeter is placed within the circuit such that the light from the dosimeter will be incident onto the photocathode of a photomultiplier tube which is not shown, for simplification of the drawings. Once the thermoluminescent dosimeter has been connected into the circuit and switch 12 has been closed, a constant voltage V is applied across the series combination of the constant resistance resistor 11 and the resistor of the thermoluminescent radiation device. For the purpose of discussion, the resistance of resistor 11 is indicated at $R_C$ and the dosimeter resistance is indicated as $R_D$. If the dosimeter has a normal average resistance, $R_D = \overline{R}_D$, the constant resistance $R_C$ (which must be capable of continuously dissipating considerable power) is chosen to have a value $R_C$ equal to the average $\overline{R}_D$ of the dosimeter group. A constant voltage V is applied across the series combination of $R_c$ and the dosimeter resistance, $R_D$. If the dosimeter has the normal resistance, $R_D = \overline{R}_D$, then the current flowing through it will be $V/2\overline{R}_D$, and the power dissipated in it will be $V^2/4\overline{R}_D$. If now another dosimeter having a resistance $R_D = k\overline{R}_D$ is substituted therefore, the current will change its value to $I = V/(1+k)\overline{R}_D$, and the corresponding power dissipated in $R_D$ will be $kV^2/(1+k)^2\overline{R}_D$. For values of $k$ near 1.00, $k/(1+k)^2 \approx 1/4$; therefore the power is practically the same as before. Table 1 illustrates the adequacy of the approximation:

TABLE 1

| $R_D/\overline{R}_D$ | Power dissipated in $R_D$ and $\overline{R}_D$ |
|---|---|
| 0.80 | 0.9877 |
| 0.85 | 0.9934 |
| 0.90 | 0.9972 |
| 0.95 | 0.9993 |
| 1.00 | 1.0000 |
| 1.05 | 0.9994 |
| 1.10 | 0.9977 |
| 1.15 | 0.9951 |
| 1.20 | 0.9917 |

As shown, a 20 percent difference between $R_D$ and $\overline{R}_D$ results in only about 1 percent change in the power dissipated in $R_D$.

The utility of this circuit as a constant power source is not limited to the present dosimetry application. It can be used as well in any electrically similar situation, where variable loads require nearly constant power. In particular, temperature-dependent variations in load resistance are also compensated for, within circuit limitations, with zero time-lag.

Obviously many modifications and variations of the present invention are possible in the light of the above teachings. It is therefore to be understood, that within the scope of the appended claims, the invention may be practiced otherwise than as specifically described.

What is claimed as new and desired to be secured by Letters Patent of the Unted States is:

1. A thermoluminescent dosimetry test system for delivering a substantially constant power to an internal ohmic heating element of a thermoluminescent dosimeter selected from a group of thermoluminescent dosimeters in which each of said internal ohmic heating elements of each of said thermoluminescent dosimeters of said group have slightly different resistance values, which comprises:

a constant voltage source, a constant resistance resistor connected electrically in series with said constant voltage source, said constant resistance resistor having a resistance value equal to the average resistance value of the ohmic heating elements of said group of thermoluminescent dosimeters, spaced contacts for singularly connecting each of said ohmic heating elements electrically in series with said constant resistance resistor and said voltage source, and a switch in said system for electrically controlling said system.

2. A test system as claimed in claim 1 wherein the resistance value of said ohmic heating elements of said group of thermoluminescent dosimeters does not vary more than ±20% from the average resistance value of the group.

3. A system as claimed in claim 1 wherein said constant-resistance resistor is variable whereby the constant resistance value may be adjusted and set equal to the average resistance value of any desired group of ohmic heating elements in which their resistance values are approximately the same.

4. A method of heating thermoluminescence dosimeters designed with an internal ohmic heating element therein to determine the amount of radiation dosage incident on said dosimeter, comprising:

connecting a constant-resistance resistor having a resistance value substantially the same resistance value as the ohmic heating element contained in said dosimeter in series with a constant-voltage source, and connecting said internal ohmic heating element within said dosimeter in series with said constant-resistance resistor connected in series with said voltage source.

References Cited

UNITED STATES PATENTS

| 2,312,429 | 3/1943 | Lucan | 315—309 X |
| 3,288,997 | 11/1966 | McCall | 250—71.5 |
| 3,319,119 | 5/1967 | Rendina | 315—291 X |
| 3,376,416 | 4/1968 | Rutland et al. | 250—83.3 X |

ARCHIE R. BORCHELT, Primary Examiner

U.S. Cl. X.R.

250—71, 83